(12) United States Patent
Lappi et al.

(10) Patent No.: US 10,649,909 B2
(45) Date of Patent: May 12, 2020

(54) LOGICAL BLOCK ADDRESSING RANGE COLLISION CRAWLER

(71) Applicant: Western Digital Technologies, Inc., San Jose, CA (US)

(72) Inventors: Cory Lappi, Rochester, MN (US); Darin Edward Gerhart, Oronoco, MN (US); Nicholas Edward Ortmeier, Rochester, MN (US); William Jared Walker, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/137,261

(22) Filed: Sep. 20, 2018

(65) Prior Publication Data
US 2019/0384719 A1    Dec. 19, 2019

Related U.S. Application Data

(60) Provisional application No. 62/685,196, filed on Jun. 14, 2018.

(51) Int. Cl.
*G06F 12/1009*    (2016.01)

(52) U.S. Cl.
CPC .. *G06F 12/1009* (2013.01); *G06F 2212/1008* (2013.01); *G06F 2212/657* (2013.01)

(58) Field of Classification Search
CPC ............... G06F 1/00–3296; G06F 3/00; G06F 3/06–0689; G06F 5/00–16;
(Continued)

(56) References Cited

U.S. PATENT DOCUMENTS 6,256,713 B1    7/2001   Audityan et al.
6,490,635 B1 *  12/2002  Holmes ................. G06F 3/0605
                                                          710/15
(Continued)

FOREIGN PATENT DOCUMENTS

EP          1132820 A2      9/2001
KR   10-2017-0122648 A      11/2017

OTHER PUBLICATIONS

QuickStore: a high performance mapped object store; White et al.; The VLDB Journal—The International Journal on Very Large Data Bases; Oct. 1995 (Year: 1995).*
(Continued)

*Primary Examiner* — Daniel C. Chappell
(74) *Attorney, Agent, or Firm* — Patterson & Sheridan, LLP (57) ABSTRACT

A device having a controller configured to execute a range crawler algorithm residing in firmware or hardware and a data table containing one or more range entries (RE's), where each of the RE's is part of a logical block address (LBA) span associated with a command instruction, and where each LBA span has one or more LBA ranges, and where each LBA range is made of one or more sequential LBA's. The device also includes a collision bitmap configured to store data associated with RE collisions between one or more LBA's and a command dispatcher configured to release selected LBA ranges that are not associated with a RE collision. The range crawler algorithm is configured to search the data table to detect collisions between the RE's.

25 Claims, 7 Drawing Sheets

(58) Field of Classification Search
CPC .......... G06F 8/00–78; G06F 9/00–548; G06F 11/00–3696; G06F 12/00–16; G06F 13/00–4295; G06F 16/00–986; G06F 17/00–5095; G06F 21/00–88; G06F 203/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G11C 11/00–5692; G11C 13/00–06; G11C 14/00–009; G11C 15/00–06; G11C 16/00–3495; G11C 17/00–18; G11C 2216/00–30
See application file for complete search history.

(56) References Cited

U.S. PATENT DOCUMENTS

| | | | |
|---|---|---|---|
| 6,981,125 B2 * | 12/2005 | Emmes | G06F 12/1009 711/207 |
| 7,278,008 B1 * | 10/2007 | Case | G06F 12/1036 711/209 |
| 9,251,061 B2 * | 2/2016 | Karamcheti | G11C 5/04 |
| 9,384,133 B2 * | 7/2016 | Gschwind | G06F 12/0833 |
| 9,619,401 B2 * | 4/2017 | Gandhi | G06F 9/455 |
| 9,864,690 B2 * | 1/2018 | Gschwind | G06F 12/084 |
| 10,534,719 B2 * | 1/2020 | Beard | G06F 12/0862 |
| 10,565,126 B2 * | 2/2020 | Beard | G06F 12/1054 |
| 2003/0177335 A1 * | 9/2003 | Luick | G06F 9/3834 711/210 |
| 2007/0300037 A1 * | 12/2007 | Rogers | G06F 12/0292 711/202 |
| 2009/0190598 A1 * | 7/2009 | Christensen | H04L 12/2856 370/395.53 |
| 2009/0254689 A1 * | 10/2009 | Karamcheti | G06F 12/0246 710/301 |
| 2012/0131197 A1 * | 5/2012 | Prentice | H04L 61/103 709/226 |
| 2014/0025923 A1 * | 1/2014 | Klein | G06F 12/1027 711/207 |
| 2014/0075101 A1 * | 3/2014 | Karamcheti | G11C 5/04 711/103 |
| 2015/0032936 A1 * | 1/2015 | Yu | G06F 12/0246 711/103 |
| 2015/0347044 A1 * | 12/2015 | Gschwind | G06F 3/0619 711/3 |
| 2015/0378895 A1 * | 12/2015 | Gschwind | G06F 12/084 711/130 |
| 2016/0077885 A1 | 3/2016 | Ebsen et al. | |
| 2016/0259731 A1 * | 9/2016 | Evans | G06F 12/10 |
| 2017/0262380 A1 * | 9/2017 | Yoshida | G06F 12/1009 |
| 2017/0315851 A1 | 11/2017 | Hicks et al. | |
| 2018/0018287 A1 * | 1/2018 | Walker | G06F 21/602 |
| 2018/0074708 A1 * | 3/2018 | Gerhart | G06F 3/064 |
| 2018/0121364 A1 * | 5/2018 | Edgar | G06F 12/1009 |
| 2018/0157598 A1 * | 6/2018 | Chan | G06F 12/1027 |
| 2018/0157601 A1 * | 6/2018 | Bryant | G06F 12/12 |

OTHER PUBLICATIONS

Fast and Complete Conflict Detection for Packet Classifiers; Lai et al.; IEEE Systems Journal, vol. 11, iss. 2, pp. 1137-1148; Jun. 2017 (Year: 2017).*
International Search Report and Written Opinion issued in corresponding International Application No. PCT/US2019/01790, dated May 27, 2019 (5 pages).

* cited by examiner

| CMD SLOT (302) | TIMESTAMP (304) | CMD (306) | START (308) | LENGTH (310) | LIST PTR (312) |
|---|---|---|---|---|---|
| 0 | 1.000 | Wr10 | 0 | 8 | 0 |
| 1 | 1.002 | Rd10 | 0 | 16 | 1 |
| 2 | 1.004 | Unmap | 42 | 16 | 2 |
| 3 | 1.006 | WrSUnmp | 0 | EOD | 3 |
| 4 | 0 | 0 | 0 | 0 | 4 |
| 5 | 0.900 | Wr10 | 0 | 8 | 5 |
| 6 | 0.902 | INQUIRY | 0 | 0 | 6 |
| 7 | 0.904 | Rd10 | 0 | 8 | 7 |

| RE INDEX (352) | START LBA (354) | LENGTH (356) | NEXT RE (358) | ALTERS DATA (360) | TIMESTAMP (362) | RANGE COLLISION BITMAP (364) |
|---|---|---|---|---|---|---|
| 0 | 0 | 8 | END | TRUE | 1.000 | 0x00A0 |
| 1 | 0 | 16 | END | FALSE | 1.002 | 0x00A1 |
| 2 | 42 | 4 | 8 | TRUE | 1.004 | 0x0000 |
| 3 | 0 | EOD | END | TRUE | 1.006 | 0x07A7 |
| 4 | EOD | EOD | END | FALSE | 0 | 0x0000 |
| 5 | 0 | 8 | END | TRUE | .900 | 0x0000 |
| 6 | EOD | EOD | END | FALSE | .902 | 0x0000 |
| 7 | 0 | 8 | END | FALSE | .904 | 0x0020 |
| 8 | 40 | 4 | 9 | TRUE | 1.004 | 0x0000 |
| 9 | 48 | 4 | 10 | TRUE | 1.004 | 0x0000 |
| 10 | 56 | 4 | END | TRUE | 1.004 | 0x0000 |
| 11 | EOD | EOD | END | FALSE | 0 | 0x0000 |
| 12 | EOD | EOD | END | FALSE | 0 | 0x0000 |
| 13 | EOD | EOD | END | FALSE | 0 | 0x0000 |
| 14 | EOD | EOD | END | FALSE | 0 | 0x0000 |
| 15 | EOD | EOD | END | FALSE | 0 | 0x0000 |

FULL DRIVE WRITE SAME UNMAP RECEIVED, RANGE ENTRIES 0,1,2, 5,7,8,9, AND 10 CONFLICT HERE. MARK COLLISIONS FOR 0,1,2,5,7, 8,9, AND 10.

LOGICAL BLOCK ADDRESSING RANGE COLLISION CRAWLER

CROSS-REFERENCE TO RELATED APPLICATIONS

The present application claims priority to Provisional Application 62/685,196 filed on Jun. 14, 2018 the entirety of which is incorporated by reference.

BACKGROUND OF THE DISCLOSURE

Field of the Disclosure

Embodiments of the present disclosure generally relate to data address management and more specifically to dispatching partial segments of a logical block address (LBA) when a collision is detected.

Description of the Related Art

Data collisions occur within a processor when two or more command instructions attempt to access the same address in memory at the same time. Presently, when a collision is detected by a processor, such as a solid state drive (SSD) controller, one response is to execute the command instructions serially in the order of reception to ensure that the data content is transferred in a deterministic manner, which results in a negative impact on program performance. Another response is to cancel both command instructions, thus preventing either instruction from accessing the memory location and slowing down the program. Furthermore, for command instructions having scattered (e.g.: partial or disjointed) LBA ranges, the processor stalls the execution of command instructions until the data for the full LBA range is received. These approaches introduce delays and inefficiencies into the operating environment by delaying command receive/dispatch instructions and reducing the Quality-of-Service (QoS) of the system.

Thus, what is needed is a device and method for detecting and responding to data collisions for full and partial LBA collisions that boosts performance, efficiency, and QoS.

SUMMARY OF THE DISCLOSURE

In one embodiment, a device having a controller configured to execute a range crawler algorithm residing in firmware and a data table containing one or more range entries (RE's), where each of the RE's is part of a LBA span associated with a command instruction, and where each LBA span has one or more LBA ranges, and where each LBA range is made of one or more sequential LBA's. The device also includes a collision bitmap configured to store data associated with RE collisions between one or more LBA's and a command dispatcher configured to release selected LBA ranges that are not associated with a RE collision. The range crawler algorithm is configured to search the data table to detect collisions between the RE's.

In another embodiment, a device having a controller configured to execute a range crawler algorithm residing in hardware on the controller and a data table configured to store one or more RE's, where each of the one or more RE's is part of a LBA span associated with a command instruction, with each LBA span made of one or more LBA ranges, and where each LBA range is made of one or more sequential LBA's. The device also includes a collision bitmap configured to store data associated with RE collisions between one or more LBA's and a command dispatcher configured to release selected LBA ranges that are not associated with a RE collision, where the range crawler algorithm is configured to search the data table to detect collisions between the RE's. The device also includes a means for detecting and responding to collisions between RE's, where the range crawler algorithm is configured to search the data table to detect collisions between the RE's, and responding to collisions includes dispatching, by the command dispatcher, selected LBA spans based on the collision bitmap.

In another embodiment, a device having a controller configured to execute a range crawler algorithm residing in hardware separate from the controller and a data table configured to store one or more RE's, where each of the one or more RE's is part of a LBA span associated with a command instruction, each LBA span includes one or more LBA ranges, and each LBA range includes one or more sequential LBA's. The device also includes a collision bitmap configured to store data associated with RE collisions between one or more LBA's, and a command dispatcher configured to release selected full and partial LBA ranges that are not associated with a collision, where the range crawler algorithm is configured to search the data table to detect collisions between the RE's.

In another embodiment, a method for conducting collision management of a storage device, the method including receiving, from a controller, one or more command instructions, where each command instruction accesses a LBA span, and where each LBA span includes multiple ranges. The method also includes storing, by a data table, a RE associated with each LBA range, detecting, by a range crawler algorithm, a collision between two or more RE's, updating, by the controller, a collision bitmap based on the collision, and dispatching, by a command dispatcher, selected LBA ranges to the storage device based on the collision bitmap.

In another embodiment, a method of operating a range crawler algorithm for a storage device, the method includes receiving, from a data table, one or more RE's; where each RE contains a LBA range associated with a command instruction, and comparing, by the range crawler algorithm, two or more RE's. The method also includes detecting, by the range crawler algorithm, a collision between two or more RE's, updating, by the range crawler algorithm, a collision bitmap based on detecting a collision, and dispatching selected LBA's ranges based on the collision bitmap.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally describes a device having a controller configured to execute a range crawler algorithm residing in firmware or hardware and a data table containing one or more RE's, where each of the RE's is part of a LBA span associated with a command instruction, and where each LBA span has one or more LBA ranges, and where each LBA range is made of one or more sequential LBA's. The device also includes a collision bitmap configured to store data associated with RE collisions between one or more LBA's and a command dispatcher configured to release selected LBA ranges that are not associated with a RE collision. The range crawler algorithm is configured to search the data table to detect collisions between the RE's.

Figure 1:
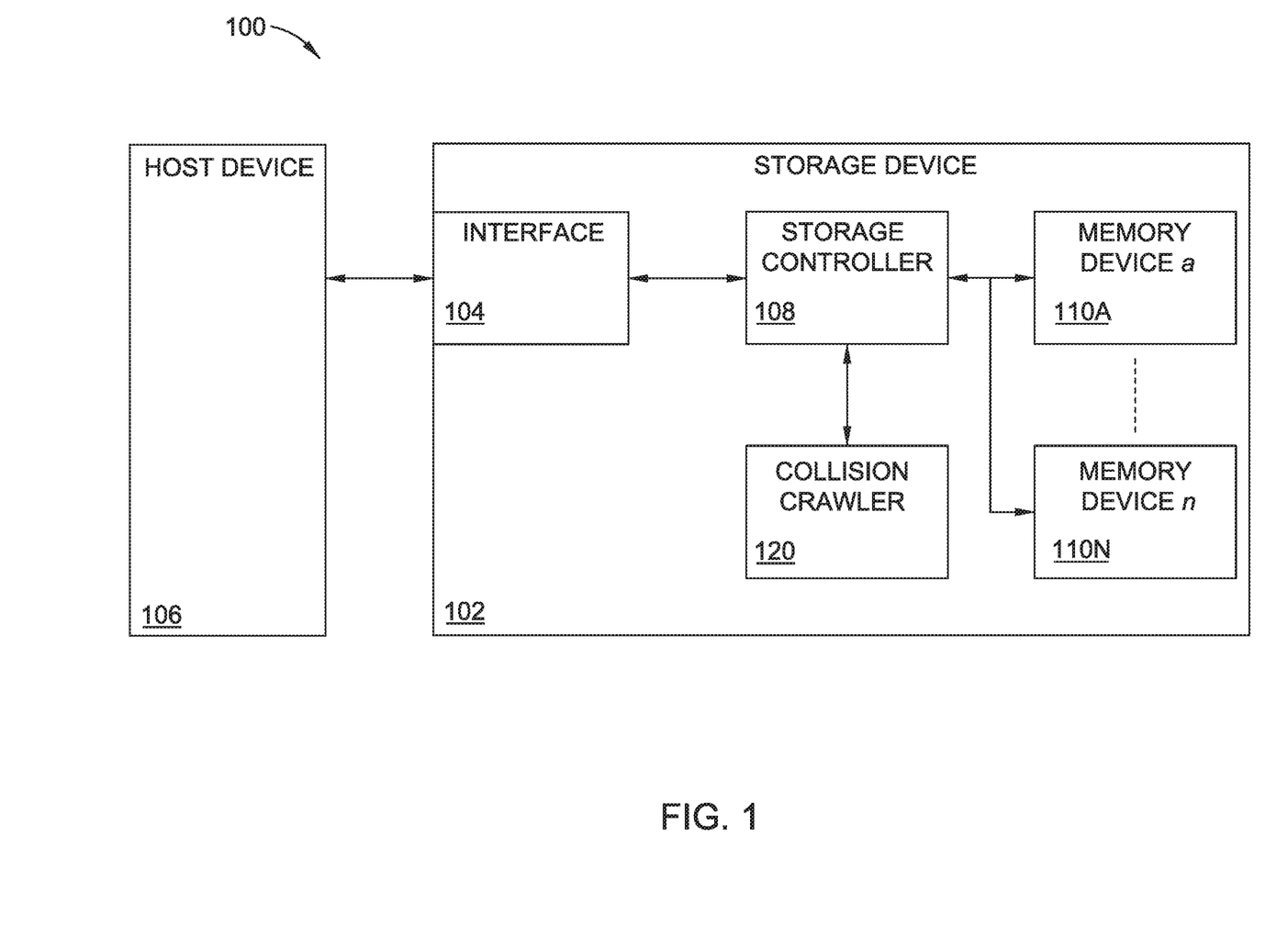
FIG. 1 is a schematic block diagram illustrating a storage system in which a storage device is coupled with a host device, according to one embodiment.

FIG. 1 is a schematic block diagram illustrating a storage system 100 in which a storage device 102 functions as memory storage and control, or a storage array, and is coupled with a host device 106, according to one embodiment. The storage system 100 can include a plurality of storage devices 102 configured as a redundant array of independent disks (RAID) that collectively function as a mass storage device for the host device 106. In one embodiment, host device 106 can utilize non-volatile memory devices included in the storage device 102 to store and retrieve data. As illustrated in FIG. 1, host device 106 communicates with the storage device 102 via an interface 104. The host device 106 can include any of a wide range of devices, including computer servers, network attached storage (NAS) units, desktop computers, notebooks (e.g., laptops) computers, tablet computers, set-top boxes, telephone handsets such as "smart" phones, "smart" pads, televisions, cameras, display devices, digital media players, video gaming consoles, video streaming devices, and the like.

As illustrated in FIG. 1, the storage device 102 includes the interface 104, a storage controller 108, one or more non-volatile memory devices 110A-110N (numbered a-n), and a LBA range collision crawler 120. In some embodiments, the storage device 102 may include additional components or modules not shown in FIG. 1 for the sake of clarity. As an example, the storage device 102 may include a printed circuit board (PCB) to which components and modules of the storage device 102 are mechanically attached and which includes electrically-conductive traces that electrically interconnect components and modules of the storage device 102 and the like. In some embodiments, the physical dimensions and connector configurations of the storage device 102 conform to one or more standard form factors. Some example standard form factors include, but are not limited to, a 3.5" data storage device (e.g., a hard disk drive (HDD) or SSD), a 2.5" data storage device, a 1.8" data storage device, a peripheral component interconnect (PCI) device, a PCI-extended (PCI-X) device, and a PCI Express (PCIe) device (e.g., PCIe ×1, ×4, ×8, ×16, PCIe Mini Card, MiniPCI, and the like). In some embodiments, the storage device 102 may be directly coupled (e.g., directly soldered) to a motherboard of the host device 106.

The interface 104 may include a data bus for exchanging data with the host device 106 and a control bus for exchanging commands with the host device 106. The interface 104 may operate in accordance with any suitable protocol. As an example, the interface 104 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially-attached SCSI (SAS), PCI, PCIe, non-volatile memory express (NVMe), and the like. The electrical connections of the interface 104 (e.g., the data bus, the control bus, or both) are electrically connected to the storage controller 108 providing electrical connections between the host device 106 and the storage controller 108. In some embodiments, the electrical connections of the interface 104 may also permit storage device 102 to receive power from the host device 106.

The storage device 102 includes one or more memory devices 110A-110N which may include a plurality of individual devices numbered a-n. Memory devices 110A-110N may be configured to store and/or retrieve data. As an example, one memory device 110A may receive data and messages from the storage controller 108 that instructs the memory device 110A to store the data. Similarly, the memory device 110A may receive messages from the storage controller 108 that instructs the memory device 110A to retrieve data. In some embodiments, each of the plurality of memory devices 110A-110N may be referred to as a die. Also in some embodiments, a single physical integrated circuit (IC or chip) may include a plurality of dies (i.e., a plurality of memory devices). In some embodiments, each memory device 110A-110N may be configured to store relatively large amounts of data (e.g., 128 MB, 256 MB, 1 GB, 2 GB, 4 GB, 8 GB, 16 GB, 32 GB, 64 GB, 128 GB, 256 GB, 512 GB, 1 TB, and the like). The examples listed herein are not limiting and other sizes are possible. Also, in some embodiments, each memory device 110A-110N may include any type of non-volatile memory, such as flash memory devices, phase-change memory (PCM) devices, resistive random-access memory (ReRAM) devices, magnetoresistive random-access memory (MRAM) devices, ferroelectric random-access memory (F-RAM) devices, holographic memory devices, and any other type of non-volatile memory device.

Flash memory devices may include NAND or NOR-based flash memory devices and may store data based on a charge contained in a floating gate of a transistor for each memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. The storage controller 108 may write data to, and read data from, NAND flash memory devices at the page level and erase data from NAND flash memory devices at the block level.

Continuing with FIG. 1, the storage device 102 includes the storage controller 108, which manages one or more operations of the storage device 102, and the collision crawler 120. In one embodiment, the storage controller 108 may manage the reading and/or writing of data from/to the memory devices 110A-110N. In some embodiments, when the storage device 102 receives a write command from the host device 106, the storage controller 108 may initiate a data storage command to store data to the memory devices 110A-110N and monitor the progress of the data storage command. In at least some embodiments, the storage controller 108 may determine at least one operational characteristic of the storage system 100 and cause the at least one operational characteristic of the storage system 100 to be stored to memory (e.g., to memory devices 110A-110N). As an example, operational characteristics may include controller register information, firmware data structures, firmware event history, host-configured mode settings (e.g., formatted capacity, power modes, encryption modes, and the like), device state (e.g., amount of drive space used, temperature of device, state of SMART parameters, etc.), host command sequence and history, and the like. Examples of firmware data structures may include performance and workload statistics, error statistics, and state information of non-volatile memory (such as amount of valid customer data and amount of memory ready to store new customer data). In some embodiments, the storage controller 108 can store the operational characteristics in a system area of one or more memory devices 110A-110N.

The LBA range collision crawler 120 is an algorithm that performs data collision detection between two or more LBA's. In some embodiments, the collision crawler 120 resides in firmware in the storage controller 108, while in other embodiments, the collision crawler 120 resides in hardware either in the storage controller 108 or outside of the storage controller 108, such as in the storage device 102 or in another module of the storage system 100. Additional details of the collision crawler are described further in FIG. 2.

Figure 2:
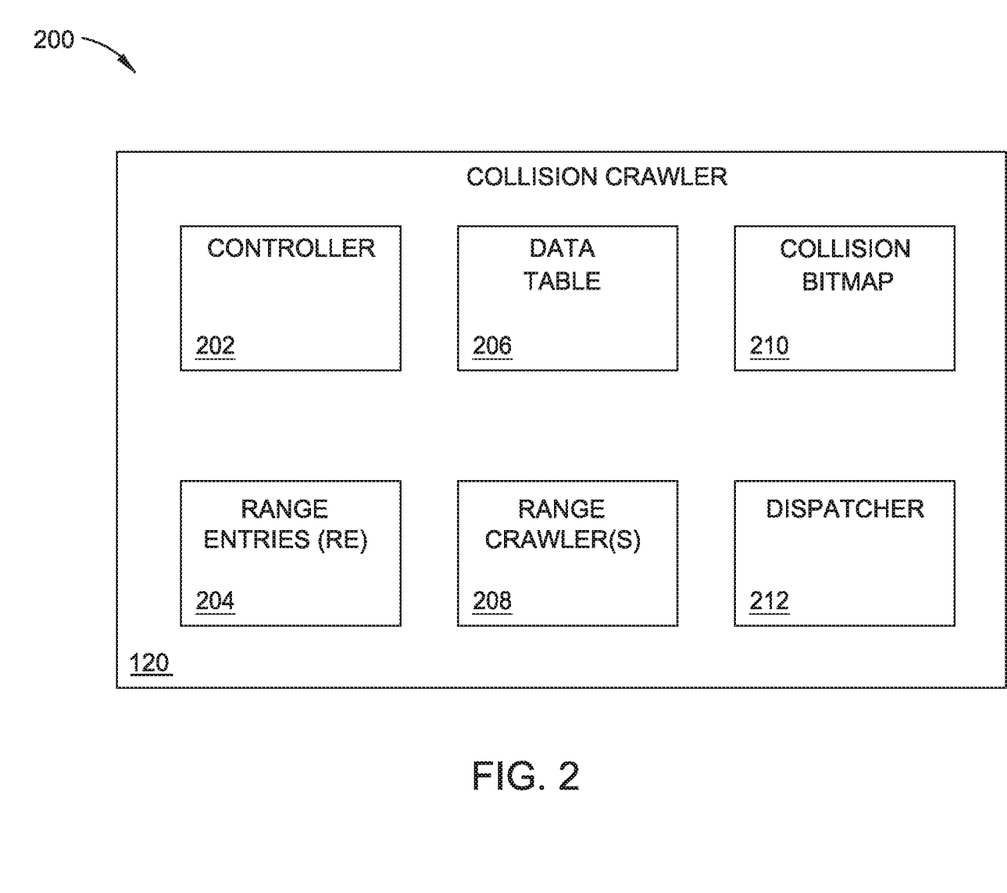
FIG. 2 is a schematic block diagram illustrating a LBA range collision crawler device, according to one embodiment.

FIG. 2 is a schematic block diagram 200 illustrating the LBA range collision crawler 120 of FIG. 1, according to one embodiment. The collision crawler 120 includes a crawler controller 202 configured to monitor and control the operations of the collision crawler 120 in detecting and responding to data collisions. In one embodiment, the crawler controller 202 is a dedicated processor within the collision crawler 120. In other embodiments, the functions of the crawler controller 202 are executed by the storage controller 108 of FIG. 1, with other embodiments possible. The collision crawler 120 also includes one or more RE's 204, which are data entries containing LBA ranges and are configured to allow the collision crawler 120 to detect data collisions between one or more RE's 204.

Figure 4:
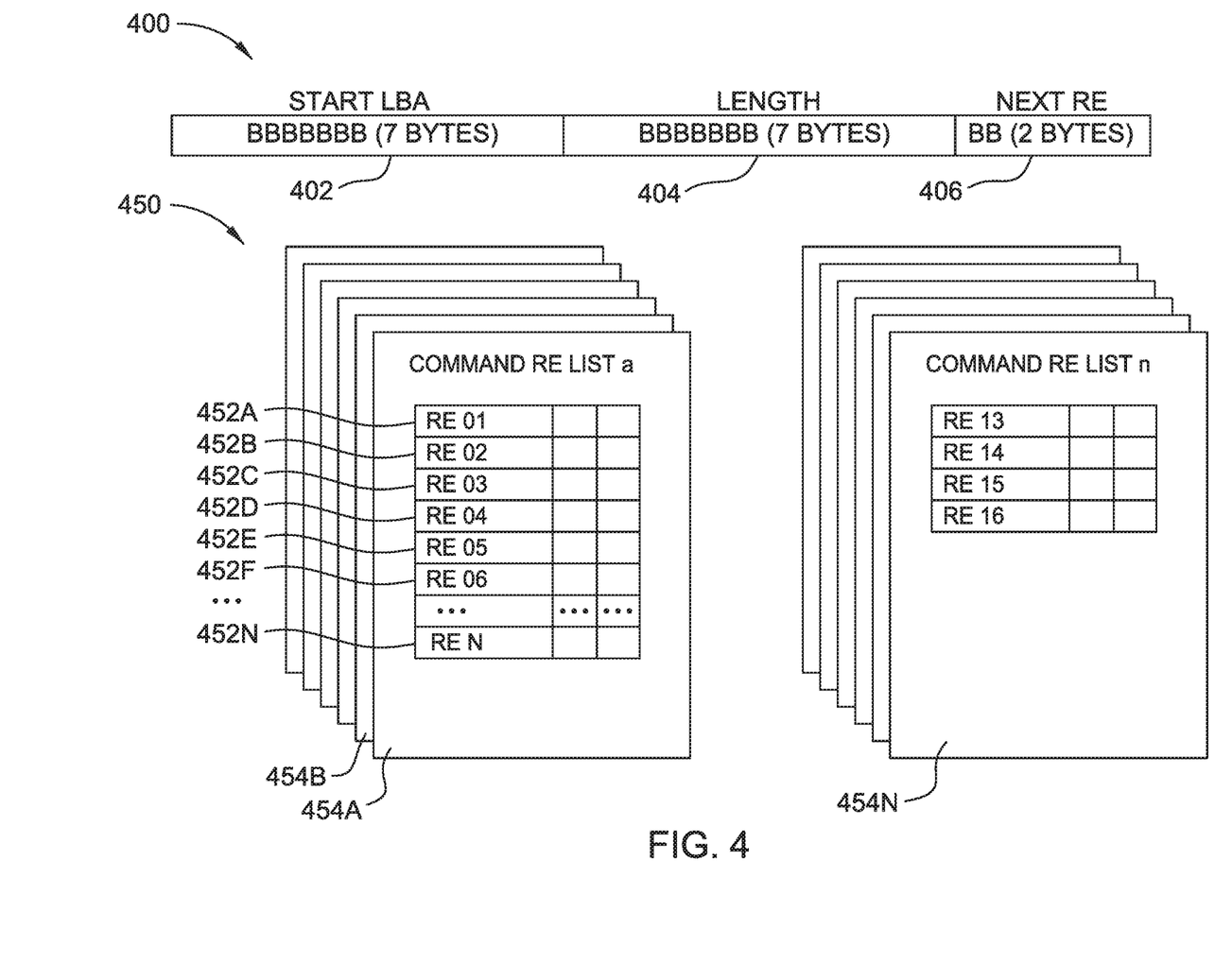
FIG. 4 is a block diagram illustrating a RE and multiple lists of RE's associated with command instructions, according to one embodiment.

The RE's 204 represent contiguous LBA spans by using a start address and a length. As an example, a RE 204 with a start value of 4 and a length of 8 would begin at LBA 4 and continue for 8 logical blocks, ending at LBA 11. The collision crawler 120 also includes one or more data tables 206 for storage of the RE's 204. The data table 206 stores and lists multiple RE's 204 based on their associated command instructions, with all RE's 204 associated under a single command instruction making up one list, and other lists of RE's 204 being formed, with each list based on different command instructions. Refer to FIG. 4 for an example of the data table 206 with multiple RE's 204 organized into several lists as described herein.

The collision crawler 120 also includes one or more range crawler algorithms 208 (range crawlers) that executes a detection process using one or more RE's 204 by comparing the LBA ranges within the RE 204 and checking to see if there are any conflicting addresses shared by both LBA's ranges in any one or any multiple of RE's 204. Any shared LBA range values are identified and stored in a collision bitmap 210, which is a location in local or remote memory that records the LBA conflict status for each RE 204 as a separate bit for each collided RE 204. In some embodiments, the range crawler algorithm 208 operates using a parsed command instruction containing a single LBA range and related RE 204. In other embodiments, the LBA range is segmented or disjointed. Also in some embodiments, multiple examples of the collision bitmap 210 are possible, with one collision bitmap 210 recording the results of comparing any two RE's 204, while in other embodiments, the collision bitmap 210 contains collision data for all RE's 204 in a single file. Finally, the collision crawler 120 includes a command dispatcher (dispatcher) 212, which is configured to hold and release full and partial LBA ranges, as appropriate, based on the contents of the collision bitmap 210. As an example, for a RE's collision bitmap 210 containing all zeroes, thus indicating no collisions, the dispatcher 212 would release the RE 204 allowing the RE LBA's to be accessed. Further details concerning the RE's 204 and comparing RE's 204 in a data table are disclosed in FIG. 4.

Figure 3:
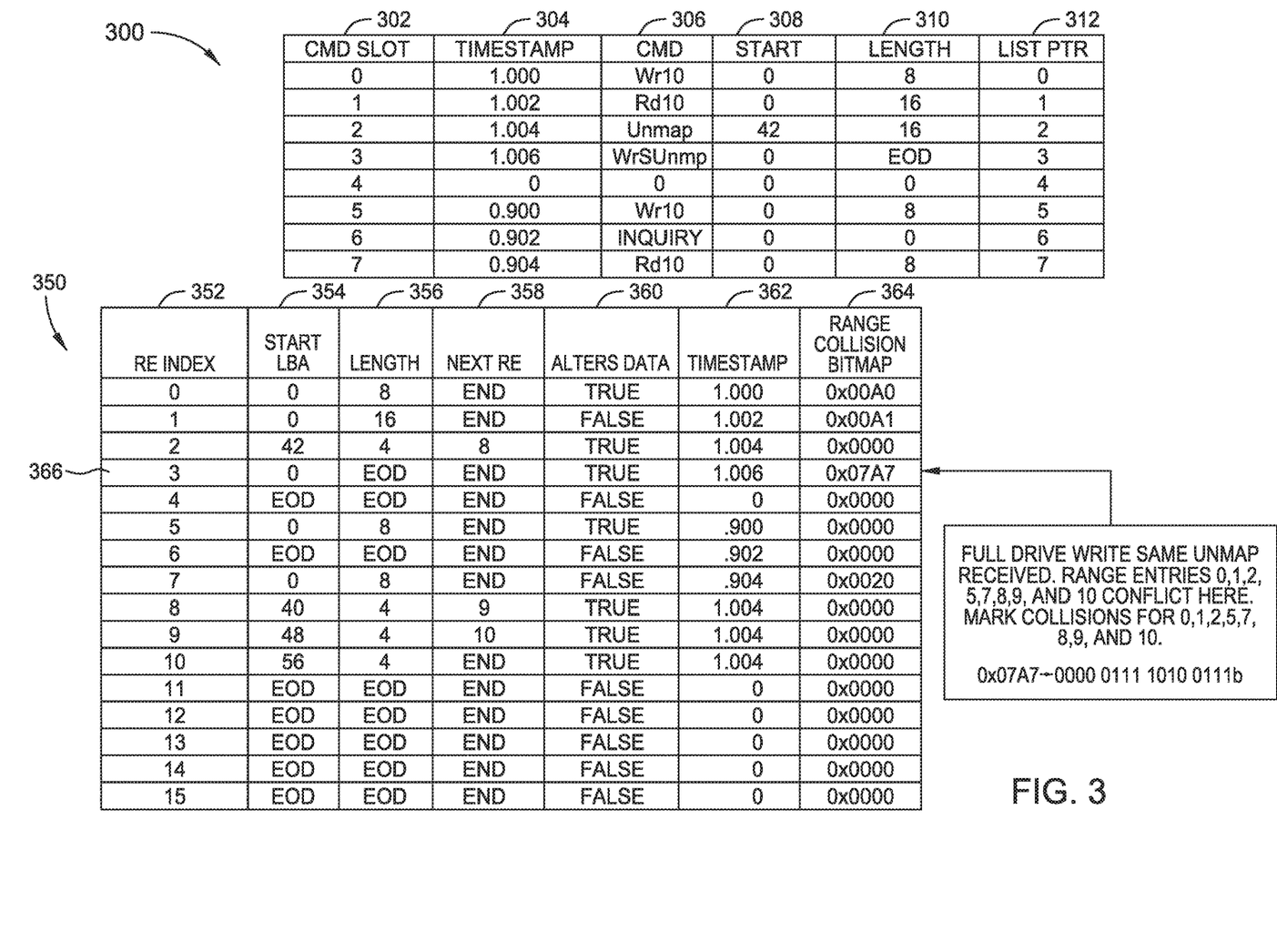
FIG. 3 illustrates a representative operation of a LBA range collision crawler, according to one embodiment.

FIG. 3 illustrates a LBA range collision crawler example having a command slot list 300 (also known as a list of command instructions) and a list of RE's 350, according to one embodiment. The range collision crawler example is one embodiment of the range crawler algorithm 208 of FIG. 2, with other embodiments possible. In the command slot list 300, several columns are identified, including the command slot ID number 302, a timestamp 304, a command 306, a start address 308, a length of the blocks accessed 310, and a list pointer 312. As an example, in command slot 302 #2, at timestamp 1.004, there is a multi-descriptor Unmap command that starts at LBA 32. It has a RE list 350 consisting of 4 REs 204 (RE 2, 8, 9, and 10), each describing the contiguous LBA spans the Unmap command applies to: RE 2 describes LBA span 32-35, RE 8 describes LBA span 40-43, RE 9 describes LBA span 48-51, and RE 10 describes LBA span 56-59. In this range collision crawler example, if any other related RE's 204 arrive after the command slot 2 Unmap command and attempts to access addresses 32-35 before RE 2 completes execution, a collision will be generated and the intruding RE 204's collision bitmap's bit 2 will be set, indicating the intruding RE 204 cannot be safely dispatched.

The LBA range collision crawler example continues with the list of RE's 350, where the list includes columns labeled RE index 352 (a reference used for this example only and not present in the list of RE's 350), start LBA 354, length 356, next RE pointer 358, alters data 360, timestamp 362, and range collision bitmap 364. There is a range collision bitmap 364 associated with each RE 204. As an example, RE index 352 #2 starts at LBA 32, is 4 logical blocks long (logical blocks 32-35), points to RE index 352 #8, and has a range collision bitmap 364 of 0x0000, indicating no collisions have been detected. With no collisions detected, this RE 204 is eligible to be executed and processed normally.

Another example is RE index #3 (reference 366) which starts at address 0, has a length that goes to the End of Drive (EOD) (in this example, 128 sectors), thus covering the range from 0-127 sectors, and has a range collision bitmap 364 of 0x07A7, indicating multiple collisions have been detected. The range collision bitmap for this RE 204 is expressed in binary form as $0000\ 0111\ 1010\ 0111_b$, and is read to mean that RE's 204 0, 1, 2, 5, 7, 8, 9, and 10 are conflicted. Therefore, RE index #3 366 would be prevented from executing until all of the conflicts have been cleared. As stated earlier, each RE 204 listed in the RE index 352 has an associated range collision bitmap 364, indicating the collision status for that specific RE 204. In the present example 350, RE index #3 366 has a collision with RE index #2, amongst others. However, as RE index #2 preceded RE index 352 #3 366, only RE index 352 #3 366 has detected a collision. The collision has been recorded in the range collision bitmap 364 under RE index #3 366.

As RE's 204 executions are completed, they are "cleared" from the RE list 350 by the dispatcher 212 of FIG. 2. As RE's 204 are cleared, the range collision crawler algorithm 208 is rerun for all RE index 352 entries, and consequently updates all of the RE index 352 entries, including updating each range collision bitmap 364. In this manner, address ranges are released by clearing or updating the RE's 204. As each RE 204 is cleared or released, the range crawlers 208 are rerun to update the collision bitmaps 364. The example disclose herein is but one embodiment and other embodiments are possible.

FIG. 4 is a block diagram illustrating a RE example 400 (such as RE 204 of FIG. 2) and a data table example 450 (such as data table 206 of FIG. 2) with multiple RE examples 452A-452N illustrated, and multiple command instruction RE lists 454A-454N (numbered a-n) of RE's 452A-452N, according to one embodiment. The RE example 400 is a data entry that includes a start LBA 402 that is 7 bytes long, a length 404 that is 7 bytes long, and a next RE 406 that is 2 bytes long, for a total size of 16 bytes. This example is not limiting, however, and other embodiments are possible.

The data table example 450 includes the command instruction RE lists 454A-454N. The data table 206 stores multiple lists 454A-454N of RE's 452A-452N as required for a particular operation. In some embodiments, the range crawler algorithm 208 is executed when the data table 206 writes or edits a RE 204. In other embodiments, the range crawler algorithm executes when a RE 204 is released by the dispatcher 212. In FIG. 4, as RE's 452A-452N are cleared or released by the dispatcher 212, and as new RE's 452A-452N are formed from the arrival of new command instructions, the lists 454A-454N are updated by entering or deleting RE's 452A-452N as appropriate.

In operation, RE's 452A-452N are compared with each other to detect any common addresses, with the results of the comparison stored in the collision bitmap 210 and as described in FIG. 3. The data table 206 stores the RE's 452A-452N for access by the range crawler algorithm 208. The devices and methods disclosed herein are employed to detect collisions between RE's 452A-452N that are stored on the list 454A-454N for a specific command instruction.

Figure 5:
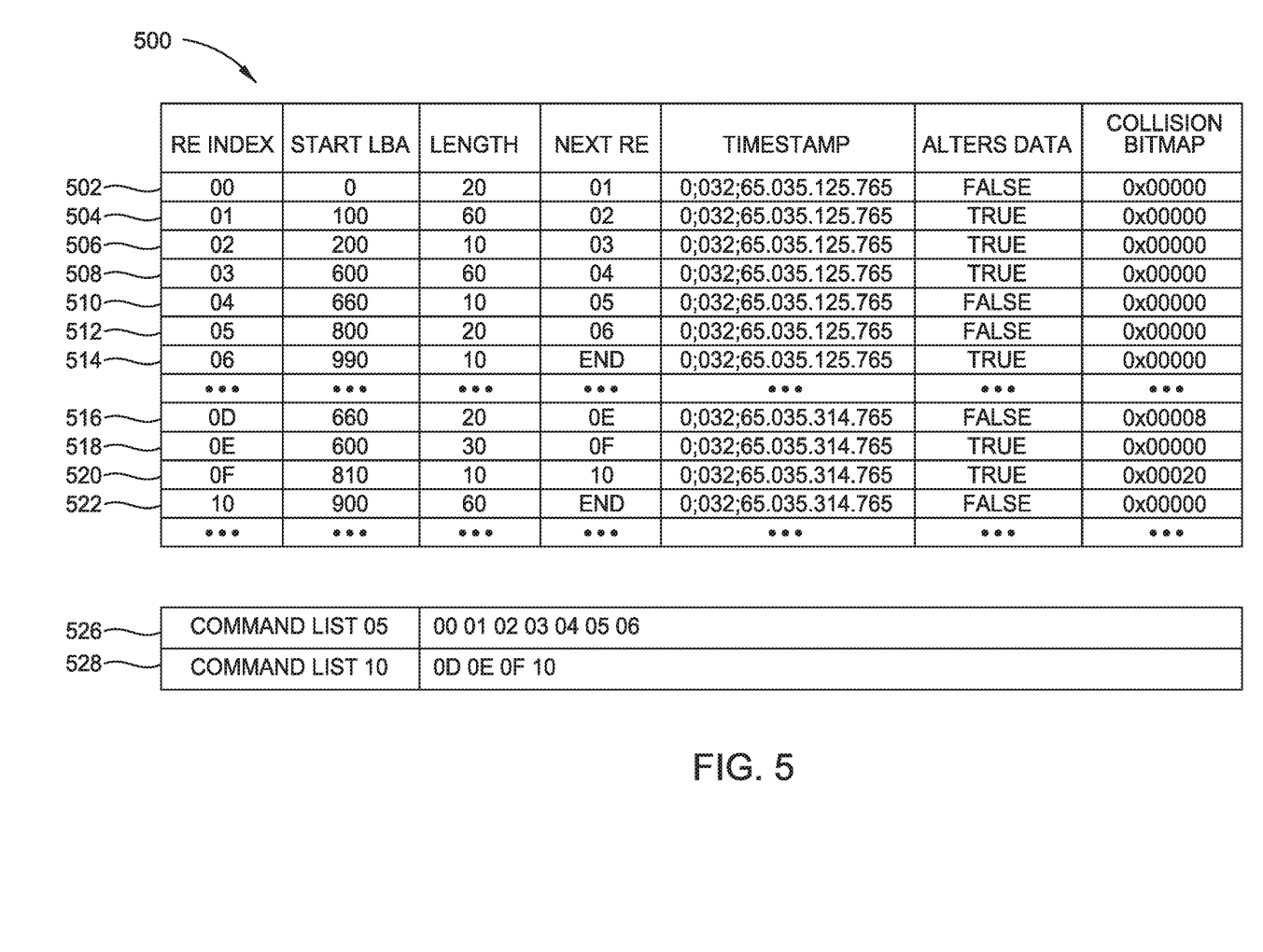
FIG. 5 illustrates multiple RE's, several collisions between RE's, and the resultant collision bitmaps, according to one embodiment.

FIG. 5 illustrates data associated with multiple RE's 204, several collisions between RE's 204, and the resultant collision bitmaps 364, according to one embodiment. Example 500 includes information on each RE 502-522, including but not limited to columns labeled RE Index, Start LBA, Length, Next RE, Timestamp, and Alters Data. The list 500 is further divided into two separate command RE lists (454A of FIG. 4), with command RE list example 526 (numbered 05) containing RE's 204 numbered 00-06, while command RE list example 528 (numbered 10) containing RE's 204 numbered 0D-10.

In example 500, there is a data collision between RE 508 (numbered 03) and RE 516 (numbered 0D) of command RE list 526 (numbered 05). There is another collision between RE 512 (numbered 05) and RE 520 (numbered 0F) of command RE list 528 (numbered 10). Due to the collision detected by the range crawler algorithm 208 (of FIG. 2), the collision bitmap 364 is updated to reflect the colliding LBA's. The range crawler 208 will attempt to detect collisions between all RE's 208 of a given command RE list 454N, with the range crawler 208 operating separately for each RE 204. As an example, with 17 RE's 204, there would be 17 range crawlers 208 operating.

Figure 6:
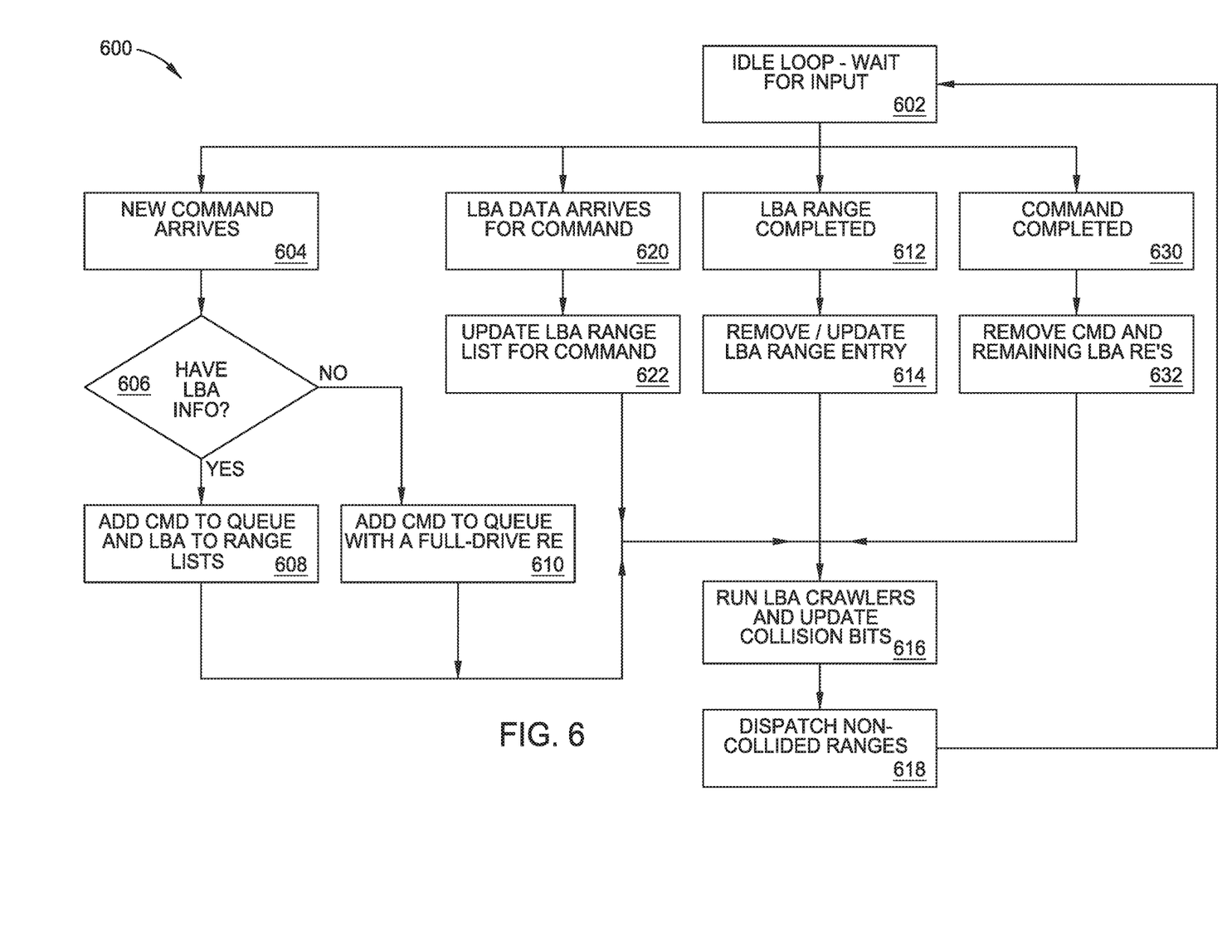
FIG. 6 is a flow chart illustrating a method for LBA RE handling for collision detection and command dispatch purposes, according to one embodiment.

FIG. 6 is a flow chart illustrating a method 600 for LBA RE handling with collision detection and command dispatch management, according to one embodiment. Method 600 illustrates an exemplary process, but the process described herein is not limiting and other embodiments are possible. The method 600 includes an idle loop at block 602, where the storage controller 108 waits for input, such as a new command instruction containing an LBA instruction. Next, at block 604, a new command instruction is received. Next, at decision block 606, the storage controller 108 determines whether the new command instruction contains LBA information. If "yes", the method 600 continues to block 608, where the command instruction is added to a command queue and a RE 204 is formed from the LBA information. Additionally, at block 608, the RE 204 is added to a command instruction RE list (refer to FIG. 4). If the answer to decision block 606 is "no", the method 600 moves to block 610, where the command instruction is added to the command queue and a full-drive RE 204 is formed. Once the task at block 610 is completed, the method 600 continues to block 616 as described below. When a new RE 204 is formed as in either block 608 or block 610, the method 600 continues to block 616, where the storage controller 108 executes a collision crawler 120. The collision crawler 120 detects any collisions between two or more RE's 204 and updates the collision bitmap 210 as needed. Next, at block 618, the dispatcher 212 releases or frees any non-collided ranges of LBA's.

Meanwhile, the method 600 also includes, at block 620, monitoring for new command instructions containing LBA data. Once this occurs, the method 600 updates the command instruction RE list 454A-454N with the new RE 204 associated with the new instruction at block 622. After any RE updates are performed, method 600 continues to block 616, where the storage controller 108 executes the collision crawler 120.

Also, while the method 600 is awaiting new commands at block 604 and new LBA data at block 620, the storage controller 108 monitors whenever a RE 204 is completed at block 612. Once this occurs, the method 600 removes or updates the RE 204 from the command instruction RE list 454A-454N at block 614, and continues by next executing the range crawler algorithm 208 as described earlier at block 616. Separately, at block 630, whenever a command instruction is completed, the method continues at block 632 by removing the command instruction from the data table 206 and removing all remaining RE's 204 associated with that command instruction. Finally, whenever a RE 204 is modified or completed at blocks 608, 610, 614, 622, or 632, the range crawler algorithm at block 616 is rerun, the collision bitmap 210 is updated, and the method continues by dispatching all non-collided RE's 204 at block 618. Once all eligible RE's 204 have been dispatched, the method 600 continues to block 602, where the method 600 awaits further input.

Figure 7:
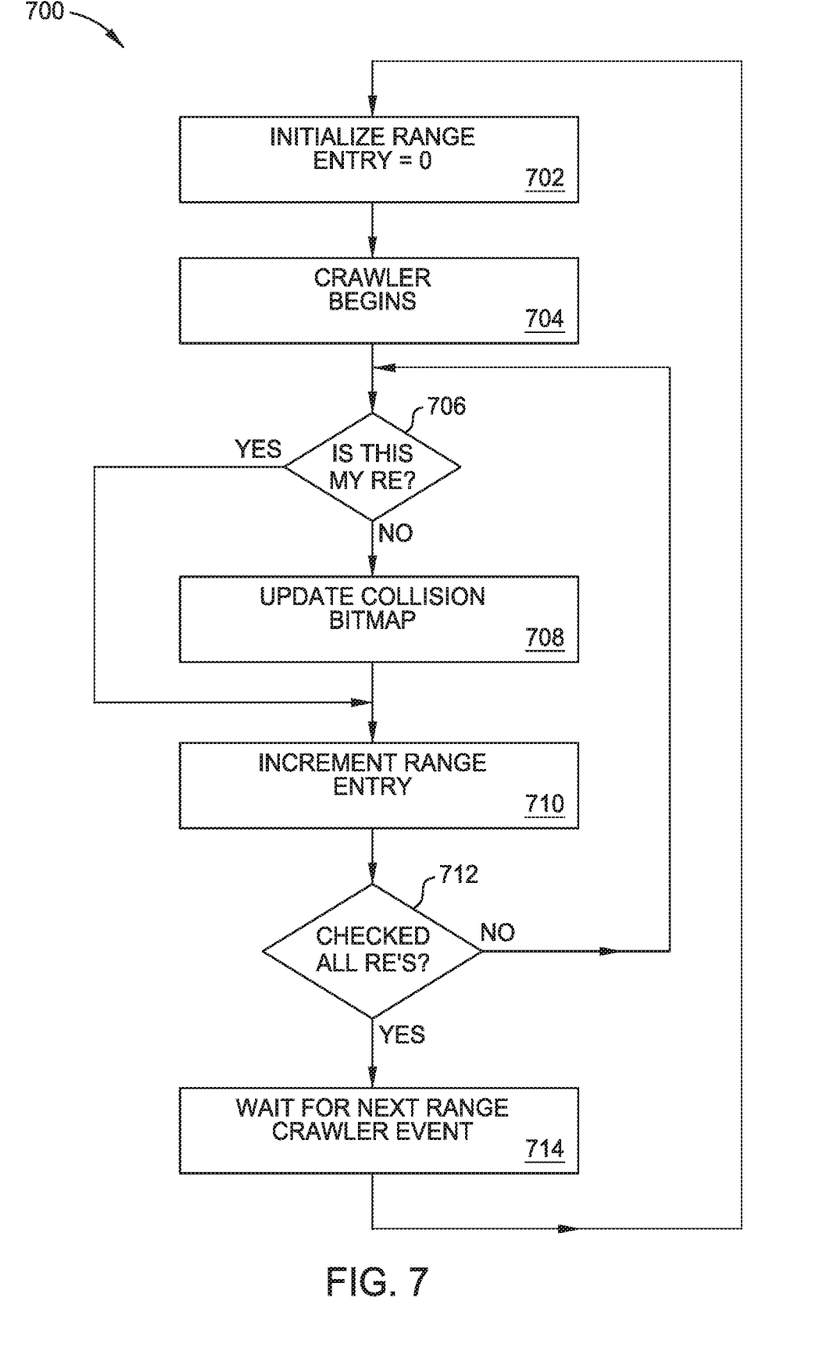
FIG. 7 is a flow chart illustrating a method of operation of a LBA range crawler algorithm associated with detecting and dispatching partial address collisions, according to one embodiment.

FIG. 7 is a flow chart illustrating a method 700 of operating a LBA range crawler algorithm 208 to check for potential RE 204 collisions following an event that changes the state of one or more of the RE's 204 in the data table 206 as requested at block 616 of FIG. 6, according to one embodiment. The method 700 begins at block 702 where each of the one or more RE's 204 are initialized by being overwritten with "zeroes" prior to being written with one or more of the LBA ranges 402. Next, at block 704, the range crawler algorithm 208 begins operating by selecting a RE 204 and performing a comparison of the LBA range contained in that RE 204 to the LBA range contained in another previously-stored RE 204 associated with command RE list 454N. The method 700 can execute multiple range crawler algorithms 208 simultaneously, with one range crawler algorithm 208 running for each command RE list 454N as required.

Next, the method 700 determines, at block 706 whether the RE 204 selected is the same RE 204 being checked, as RE's 204 are not checked for collisions with themselves. If "yes", the method skips block 708 and continues to block 710. If however, the LBA range comparison detects one or more LBAs are present in both RE's 204, block 708 updates the collision bitmap 210 with a "one" in the bit position associated with the previously-stored RE 204. If the LBA range comparison detects no common LBAs in both RE's, block 708 leaves a "zero" in the bit position associated with the previously-stored RE 204.

The method 700 continues at block 710 where, after completing collision bitmap updates at block 708, the range crawler algorithm 208 increments a RE index to the next previously-stored RE 204 at block 710 and determines whether the RE index indicates that all previously-stored RE's 204 have been checked for LBA Range conflicts at block 712. It the RE index references a previously-stored RE 204 that has not been checked, method 700 loops back to block 706 to have the range crawler algorithm 208 to check the next previously-stored RE 204 for LBA conflicts. If block 712 determines that the RE index indicates that all previously stored RE's 204 have been checked, method 700 has completed using range crawler algorithm 208 to check the new RE 204 against all previously-stored RE's 204 and is now complete until the next event occurs that necessitates another cycle of RE range crawling at block 714. FIG. 7 illustrates one method for RE checking, but other embodiments are possible, and are not limited herein.

The present disclosure illustrates devices and methods for collision detection and management of command instructions with LBA ranges, including partial collisions of LBA ranges. This disclosure allows for a generic collision management system that handles all types of command instructions, including commands with scattered LBA spans such as "unmap", "write scatter", "skip" and the like. This avoids the need for needlessly stalling command receive/dispatch operations for commands with disjointed LBA spans. Furthermore, the disclosure enables earlier dispatch for subsequent partially-collided commands due to completion on prior command instructions by dispatching the non-collided portions of LBA's. The disclosure also allows for collision updates for command instructions while other command instructions are in progress. Finally, the disclosure enables constant and deterministic collision detection time, thus improving QoS.

This disclosure includes a device having a controller configured to execute a range crawler algorithm residing in firmware or hardware and a data table containing one or more range entries (RE's), where each of the RE's is part of a logical block address (LBA) span associated with a command instruction, and where each LBA span has one or more LBA ranges, and where each LBA range is made of one or more sequential LBA's. The device also includes a collision bitmap configured to store data associated with RE collisions between one or more LBA's and a command dispatcher configured to release selected LBA ranges that are not associated with a RE collision. The range crawler algorithm is configured to search the data table to detect collisions between the RE's.

The device may also include multiple range crawler algorithms operating simultaneously. The device may also include where the range crawler algorithm identifies each LBA range of the command instruction associated with a collision in the collision bitmap. The device may also include where the range crawler algorithm is rerun whenever a RE is updated. The device may also include where the command instruction includes disjointed LBA ranges.

This disclosure describes a device having a controller configured to execute a range crawler algorithm residing in hardware on the controller and a data table configured to store one or more range entries (RE's), where each of the one or more RE's is part of a logical block address (LBA) span associated with a command instruction, each LBA span includes one or more LBA ranges, and each LBA range includes one or more sequential LBA's. The device also includes a collision bitmap configured to store data associated with RE collisions between one or more LBA's, a command dispatcher configured to release selected LBA ranges that are not associated with a RE collision, where the range crawler algorithm is configured to search the data table to detect collisions between the RE's, and means for detecting and responding to collisions between RE's, where the range crawler algorithm is configured to search the data table to detect collisions between the RE's, and responding to collisions includes dispatching, by the command dispatcher, selected LBA spans based on the collision bitmap.

The device may also include multiple range crawler algorithms operating simultaneously, where the multiple range crawler algorithms operate when the controller adds a RE to the data table via a parsed command from the controller. The device may also include multiple range crawler algorithms operating simultaneously, where the multiple range crawler algorithms operate when the controller adds a RE to the data table as a result of a data table write command. The device may also include where a given RE is removed from the data table when the associated LBA span search has been completed. The device may also include the data table having a reserved RE value configured to mark a drive-wide LBA span until the LBA range is received.

This disclosure discloses a device having a controller configured to execute a range crawler algorithm residing in hardware separate from the controller, a data table configured to store one or more range entries (RE's), where each of the one or more RE's is part of a logical block address (LBA) span associated with a command instruction, each LBA span includes one or more LBA ranges, and each LBA range includes one or more sequential LBA's, a collision bitmap configured to store data associated with RE collisions between one or more LBA's, and a command dispatcher configured to release selected full and partial LBA ranges that are not associated with a collision, where the range crawler algorithm is configured to search the data table to detect collisions between the RE's.

The device may also include where the controller executes command instructions that are required to be executed without running the range crawler algorithm by marking a full-drive LBA span associated with that instruction. The device may also include multiple range crawler algorithms running simultaneously. The device may also include where the range crawler algorithm is rerun whenever a command instruction containing a partial LBA range is completed. The device may also include the command dispatcher releasing all RE's associated with a collision bitmap having all zeroes.

The disclosure also describes a method for conducting collision management of a storage device, the method including receiving, from a controller, one or more command instructions, where each command instruction includes a logical block address (LBA), and each LBA includes multiple ranges, storing, by a data table, a range entry (RE) associated with each LBA range, detecting, by a range crawler algorithm, a collision between two or more RE's, updating, by the controller, a collision bitmap based on the collision, and dispatching, by a command dispatcher, selected LBA ranges to the storage device based on the collision bitmap.

The method may also include executing multiple range crawler algorithms simultaneously. The method may also include releasing RE's associated with a collision bitmap having all zeroes. The method may also include releasing RE's to the controller when the range crawler algorithm has finished. The method may also include updating RE's as the range crawler algorithm is executing. The method may also include where the range crawler algorithm blocks further command instructions to the LBA range associated with a current RE. The method may also include where command instructions that have priority are executed by marking a full-drive LBA range that is associated with that command instruction. The method may also include rerunning the range crawler algorithm whenever a collision is detected.

This disclosure also describes a method of operating a range crawler algorithm for a storage device, the method includes receiving, from a data table, one or more range entries (RE's); where each RE contains a logical block address (LBA) range associated with a command instruction, comparing, by the range crawler algorithm, two or more RE's, detecting, by the range crawler algorithm, a collision between two or more RE's, updating, by the range crawler algorithm, a collision bitmap based on detecting a collision, and dispatching selected LBA's ranges based on the collision bitmap. The method may also include rerunning the range crawler algorithm whenever a RE is updated.

While the foregoing is directed to embodiments of the present disclosure, other and further embodiments of the disclosure may be devised without departing from the basic scope thereof, and the scope thereof is determined by the claims that follow.

What is claimed is:

1. A device, comprising:
   a controller configured to execute a range crawler algorithm residing in firmware on the controller;
   a data table comprising one or more range entries, wherein
      each of the one or more range entries is part of a logical block address span associated with a command instruction,
      each logical block address span is comprised of one or more logical block address ranges,
      each logical block address range is comprised of one or more sequential logical block addresses, and
      the data table includes a range entry index of the range entries, a start logical block address for each range entry in the range entry index, a length of the logical block address for each range entry in the range entry index, the next range entry for each range entry in the range entry index, a timestamp for each range entry in the range entry index, and a range collision bitmap for each range entry in the range entry index;
   a collision bitmap configured to store data associated with range entry collisions between one or more logical block addresses; and
   a command dispatcher configured to release selected logical block address ranges that are not associated with a range entry collision, wherein
      the range crawler algorithm is configured to search the data table to detect collisions between the range entries.

2. The device of claim 1, further comprising multiple range crawler algorithms operating simultaneously.

3. The device of claim 1, wherein the range crawler algorithm identifies each logical block address range of the command instruction associated with a collision in the collision bitmap.

4. The device of claim 1, wherein the range crawler algorithm is rerun whenever a range entry is updated.

5. The device of claim 1, wherein the command instruction is comprised of disjointed logical block address ranges.

6. A device, comprising:
   a controller configured to execute a range crawler algorithm residing in hardware on the controller;
   a data table configured to store one or more range entries, wherein
      each of the one or more range entries is part of a logical block address span associated with a command instruction,
      each logical block address span is comprised of one or more logical block address ranges,
      each logical block address range is comprised of one or more sequential logical block addresses, and
      the data table includes a range entry index of the range entries, a start logical block address for each range entry in the range entry index, a length of the logical block address for each range entry in the range entry index, the next range entry for each range entry in the range entry index, a timestamp for each range entry in the range entry index, and a range collision bitmap for each range entry in the range entry index;
   a collision bitmap configured to store data associated with range entry collisions between one or more logical block addresses;

a command dispatcher configured to release selected logical block address ranges that are not associated with a range entry collision, wherein
the range crawler algorithm is configured to search the data table to detect collisions between the range entries; and
means for detecting and responding to collisions between range entries, wherein
the range crawler algorithm is configured to search the data table to detect collisions between the range entries, and
responding to collisions is comprised of dispatching, by the command dispatcher, selected logical block address spans based on the collision bitmap.

7. The device of claim 6, further comprising multiple range crawler algorithms operating simultaneously, wherein the multiple range crawler algorithms operate when the controller adds a range entry to the data table via a parsed command from the controller.

8. The device of claim 6, further comprising multiple range crawler algorithms operating simultaneously, wherein the multiple range crawler algorithms operate when the controller adds a range entry to the data table as a result of a data table write command.

9. The device of claim 6, wherein a given range entry is removed from the data table when a search associated with the logical block address span has been completed.

10. The device of claim 6, wherein the data table has a reserved range entry value configured to mark a drive-wide logical block address span until the logical block address ranges are received.

11. A device, comprising:
a controller configured to execute a range crawler algorithm residing in hardware separate from the controller;
a data table configured to store one or more range entries, wherein
each of the one or more range entries is part of a logical block address span associated with a command instruction,
each logical block address span is comprised of one or more logical block address ranges,
each logical block address range is comprised of one or more sequential logical block addresses, and
the data table includes a range entry index of the range entries, a start logical block address for each range entry in the range entry index, a length of the logical block address for each range entry in the range entry index, the next range entry for each range entry in the range entry index, a timestamp for each range entry in the range entry index, and a range collision bitmap for each range entry in the range entry index;
a collision bitmap configured to store data associated with range entry collisions between one or more logical block addresses; and
a command dispatcher configured to release selected full and partial logical block address ranges that are not associated with a collision, wherein
the range crawler algorithm is configured to search the data table to detect collisions between the range entries.

12. The device of claim 11, wherein the controller executes command instructions that are required to be executed without running the range crawler algorithm by marking a full-drive logical block address span associated with that instruction.

13. The device of claim 11, further comprising multiple range crawler algorithms running simultaneously.

14. The device of claim 11, wherein the range crawler algorithm is rerun whenever a command instruction containing a partial logical block address range is completed.

15. The device of claim 11, further comprising the command dispatcher releasing all range entries associated with a collision bitmap comprised of all zeroes.

16. A method for conducting collision management of a storage device, the method comprising:
receiving, from a controller, one or more command instructions, wherein
each command instruction is comprised of a logical block address, and
each logical block address is comprised of multiple ranges;
storing, by a data table, a range entry associated with each logical block address range, wherein the data table includes a range entry index of the range entries, a start logical block address for each range entry in the range entry index, a length of the logical block address for each range entry in the range entry index, the next range entry for each range entry in the range entry index, a timestamp for each range entry in the range entry index, and a range collision bitmap for each range entry in the range entry index:
detecting, by a range crawler algorithm, a collision between two or more range entries;
updating, by the controller, a collision bitmap based on the collision; and
dispatching, by a command dispatcher, selected logical block address ranges to the storage device based on the collision bitmap.

17. The method of claim 16, further comprising executing multiple range crawler algorithms simultaneously.

18. The method of claim 16, further comprising releasing range entries associated with a collision bitmap comprised of all zeroes.

19. The method of claim 16, further comprising releasing range entries to the controller when the range crawler algorithm has finished.

20. The method of claim 16, further comprising updating range entries as the range crawler algorithm is executing.

21. The method of claim 16, wherein the range crawler algorithm blocks further command instructions to the logical block address range associated with a current range entry.

22. The method of claim 16, wherein command instructions that have priority are executed by marking a full-drive logical block address range that is associated with that command instruction.

23. The method of claim 16, further comprising rerunning the range crawler algorithm whenever a collision is detected.

24. A method of operating a range crawler algorithm for a storage device, the method comprising:
receiving, from a data table, one or more range entries; wherein each range entry contains a logical block address range associated with a command instruction, wherein the data table includes a range entry index of the range entries, a start logical block address for each range entry in the range entry index, a length of the logical block address for each range entry in the range entry index, the next range entry for each range entry in the range entry index, a timestamp for each range entry in the range entry index, and a range collision bitmap for each range entry in the range entry index;
comparing, by the range crawler algorithm, two or more range entries;
detecting, by the range crawler algorithm, a collision between two or more range entries;

updating, by the range crawler algorithm, a collision bitmap based on detecting a collision; and dispatching selected logical block address ranges based on the collision bitmap.

25. The method of claim 24, further comprising rerunning the range crawler algorithm whenever a range entry is updated.

* * * * *